(12) United States Patent
Adams et al.

(10) Patent No.: US 6,654,750 B1
(45) Date of Patent: *Nov. 25, 2003

(54) NETWORK MANAGEMENT SYSTEM HAVING A NETWORK DATABASE

(75) Inventors: Robert A. Adams, Midlothian, VA (US); Ottie E. Allgood, Mechanicsville, VA (US); Andrew T. Saunders, Richmond, VA (US)

(73) Assignee: Barber-Coleman Company, Lovespark, IL (US)

(*) Notice: Subject to any disclaimer, the term of this patent is extended or adjusted under 35 U.S.C. 154(b) by 173 days.

This patent is subject to a terminal disclaimer.

(21) Appl. No.: 09/695,349

(22) Filed: Oct. 24, 2000

Related U.S. Application Data (63) Continuation of application No. 09/072,794, filed on May 5, 1998, now Pat. No. 6,185,566, which is a continuation of application No. 09/627,016, filed on Jul. 27, 2000.

(51) Int. Cl.[7] .................................................. G06F 7/00
(52) U.S. Cl. ............................ 707/10; 700/19; 709/201
(58) Field of Search .................... 707/10; 709/201–203, 709/213–215; 700/1, 2, 19–20

(56) References Cited

U.S. PATENT DOCUMENTS

| 5,453,924 A | 9/1995 | Monson et al. ............. 364/131 |
| 5,513,324 A | 4/1996 | Dolin et al. ................. 395/200 |
| 6,185,566 B1 * | 2/2001 | Adams et al. ................. 700/1 |

OTHER PUBLICATIONS

Section 7, "LonWorks Programming Model" of Motorola LonWorks Technology Device Data, Rev. 3.1 published in 1997 by Motorola Corporation of Illinois.
Section 8, "LonTalk Protocol" of Motorola LonWorks Technology Device Data, Rev. 3.1 published in 1997 by Motorola Corporation of Illinois.
Appendix A "Neuron Chip Data Structures" of Motorola LonWorks Technology Device Data, Rev. 3.1 published in 1997 by Motorola Corporation of Illinois.
Appendix B "Network Management and Diagnostic Services" of Motorola LonWorks Technology Device Data, Rev. 3.1 published in 1997 by Motorola Corporation of Illinois.

* cited by examiner

Primary Examiner—Hosain T. Alam (57) ABSTRACT

A network management system includes an embedded node, having network database and communications elements, which is coupled locally on an ECHELON network. This local coupling provides a relatively high bandwidth connection to accommodate relatively high traffic volume between the network database and nodes for improved system performance relative to prior art configurations. Locally coupling the network database to the network eliminates the need to tunnel various messages needed to effect a network service when using a tiered architecture common in the HVAC industry. The communications elements include com ports adapted to couple the embedded node to a workstation via a conventional network, and to an ECHELON network.

20 Claims, 9 Drawing Sheets

NETWORK MANAGEMENT SYSTEM HAVING A NETWORK DATABASE

This application is a continuation of Ser. No. 09/072,794 filed May 5, 1998 which is a continuation of Ser. No. 09/627,016 filed Jul. 27, 2000.

TECHNICAL FIELD

Appendix

One Computer Program Listing Appendix on compact disc is included with this application. The Appendix is a software code listing comprising a single file entitled "Appendix."

The present invention relates, in general, to network management systems. In particular, the present invention relates to method and systems for network management in an ECHELON network.

BACKGROUND OF THE INVENTION

The use of computer networking techniques is rapidly growing. Computer networks are being used to interconnect a wide variety of devices from industrial control systems to home appliances. In these emerging networks, many 'embedded' computers are being attached to networks. As used herein, the term 'embedded' computer refers to a device having a processor within it and in some cases limited user I/O ("input and/or output"), but lacking a complex user interface such as a large display and full keyboard. The term 'node' refers to a device that is connected to the network and is capable of communicating with other network devices. Similarly, the term 'embedded node' refers to a device having an embedded computer within it that is connected to a network and is capable of communicating with other network devices or nodes. The term 'local' or 'local coupling' refers to being coupled directly to other network nodes by a communication bus without any intervening devices. Conversely, the term 'remote' or 'remote coupling' refers to being coupled to other nodes indirectly, i.e. through another device, such as by "tunneling" through another network or device, or by modem.

Although embedded computers have conducted communications over networks in the past, network management systems supporting them have had various limitations. The term 'network management' as used herein refers to management of configurations, connections, and other parameters related to the particular network. In most instances where network management functionality is required, larger computers (e.g., user workstation) have been used to provide such functionality. This is problematic in networking environments where such larger computers are impractical or unfeasible. For example, in a small to medium sized HVAC (i.e., heating, ventilation and air-conditioning) system, it is not economically prudent to include a larger computer on the network with the embedded controller. Thus, for any network management function to be performed, it is conventional for a technician to arrive with a portable computer and attach it to the network, thereby facilitating certain network management functions.

Figure 1:
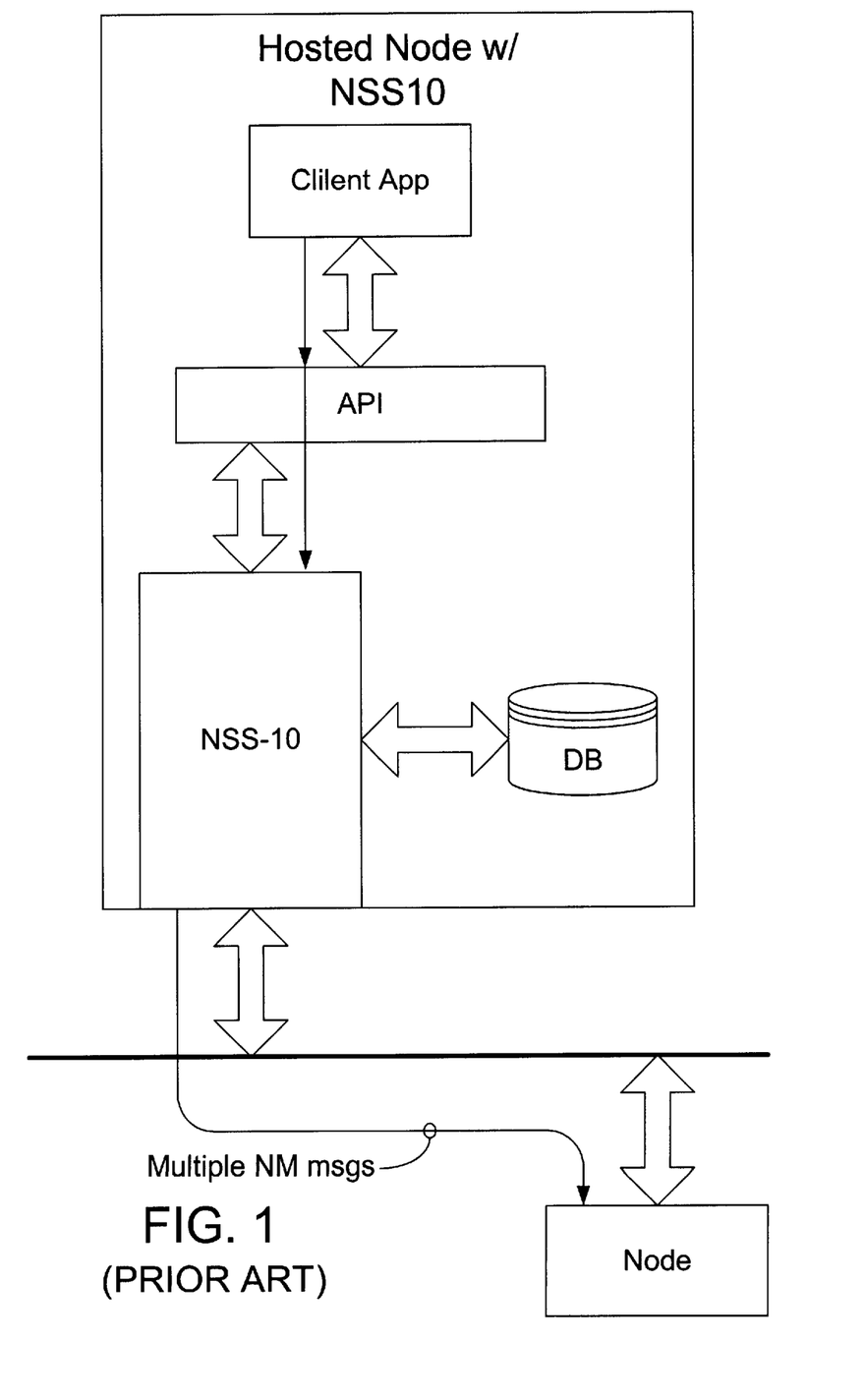
FIGS. 1–2 are prior art network management implementations in ECHELON networks.
Figure 2:
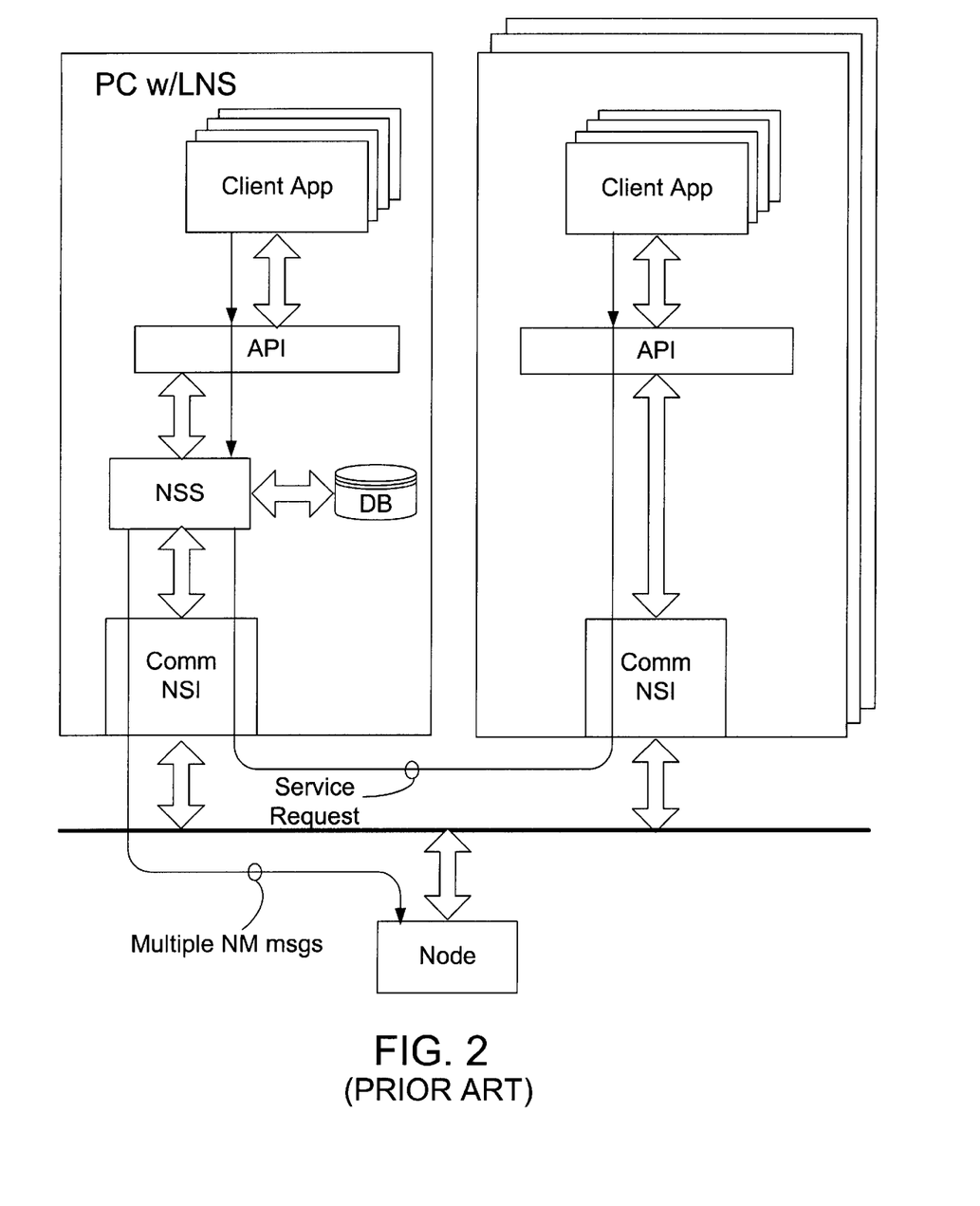

As one networking example, ECHELON networks (developed by Echelon Corporation of Palo Alto, Calif.) are used in a variety of embedded processor applications and are especially well-suited to networking process and environmental control devices. As used herein, the term 'ECHELON network' refers to a network consisting of devices or nodes that implement a LONTALK protocol. LONTALK is a trademark of the aforementioned ECHELON Corporation and refers to a protocol used by applications to communicate with nodes in an ECHELON network. An overview of the LONTALK protocol is described in section 8 of *Motorola LonWorks Technology Device Data, Rev.* 3.1 (hereinafter, "LonWorks Tech. Publication") published in 1997 by Motorola Corporation of Palatine, Ill. The LONTALK protocol provides a means of exchanging data between devices using Network Variables as described in sections 7.2 and 7.3 of the LonWorks Tech. Publication. There are various data structures within an Echelon device, which must be correctly configured for the device to function correctly. These data structures are described in Appendix A of the LonWorks Tech. Publication. The messages defined in the LONTALK protocol which are needed to configure these various data structures and otherwise control and monitor the device are described in Appendix B. Sections 7, 8 and Appendices A and B of the LonWorks Tech. Publication are fully incorporated by reference herein. One example of a prior art network management device for an ECHELON network is the model NSS-10 from Echelon Corp. shown in FIG. 1. The NSS-10 includes a hosted ECHELON node (i.e., an ECHELON communication chipset having a processor available for executing user applications) that includes a network database and a single client application locally attached thereto. Only a single, local, client application is supported. Another example of a prior art network management system for an ECHELON network is the model LNS system from Echelon Corp. shown in FIG. 2. LNS is a non-embedded solution and is too expensive and impractical for many ECHELON networks. For example, being non-embedded, LNS would have to be coupled remotely to the ECHELON network to support the network architectures common in the HVAC industry, i.e. by "tunneling" through other networks or by serial port modem. Such remote coupling generally introduces signal timing and other complexities into the system.

Thus, there does not exist a network management system for an ECHELON network that is embeddable, inexpensive and supportive of multiple clients. The present invention is a solution to this problem.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

Figure 3:
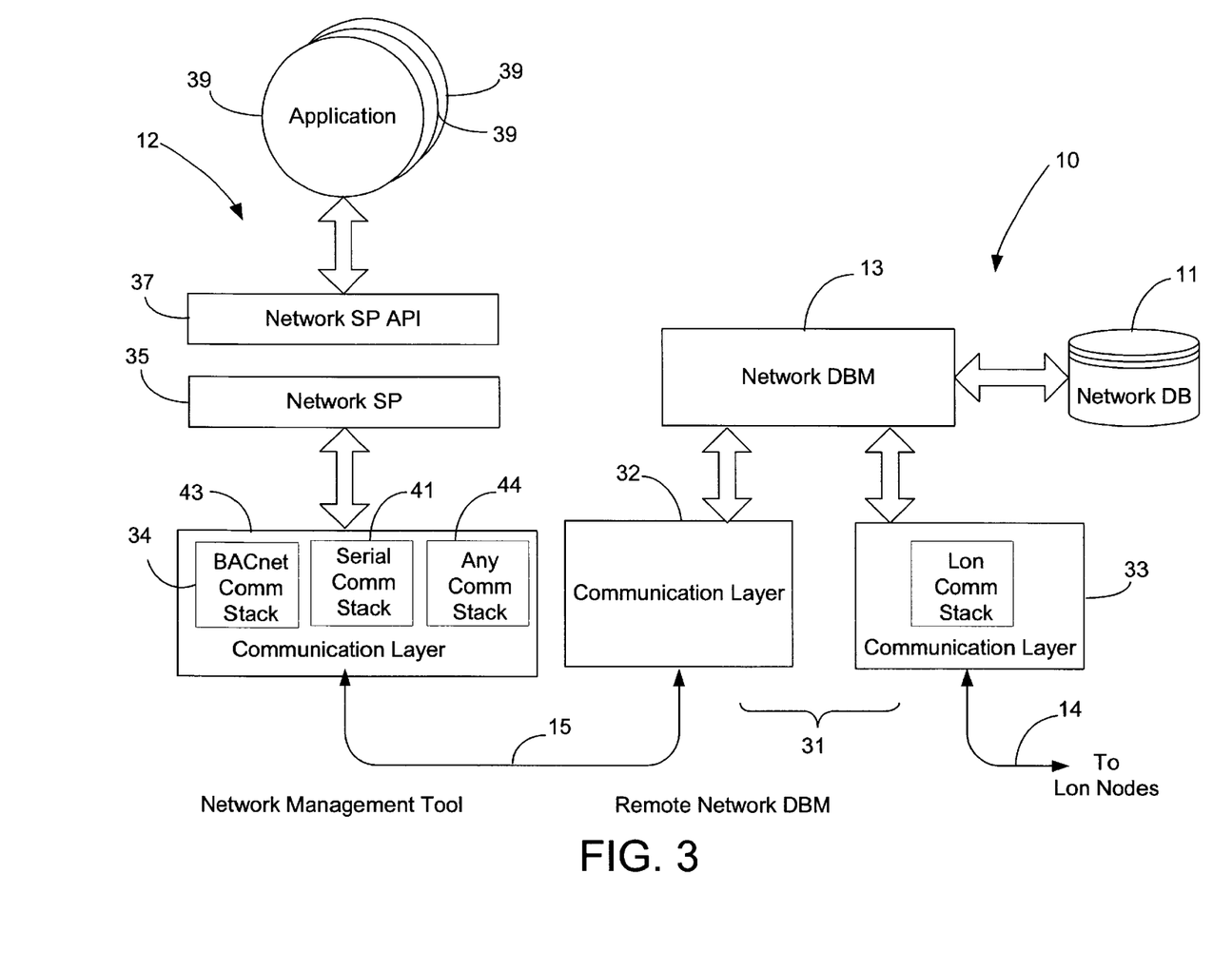
FIGS. 3–5 are system diagrams of components of network management systems in accordance with embodiments of the present invention.
Figure 4:
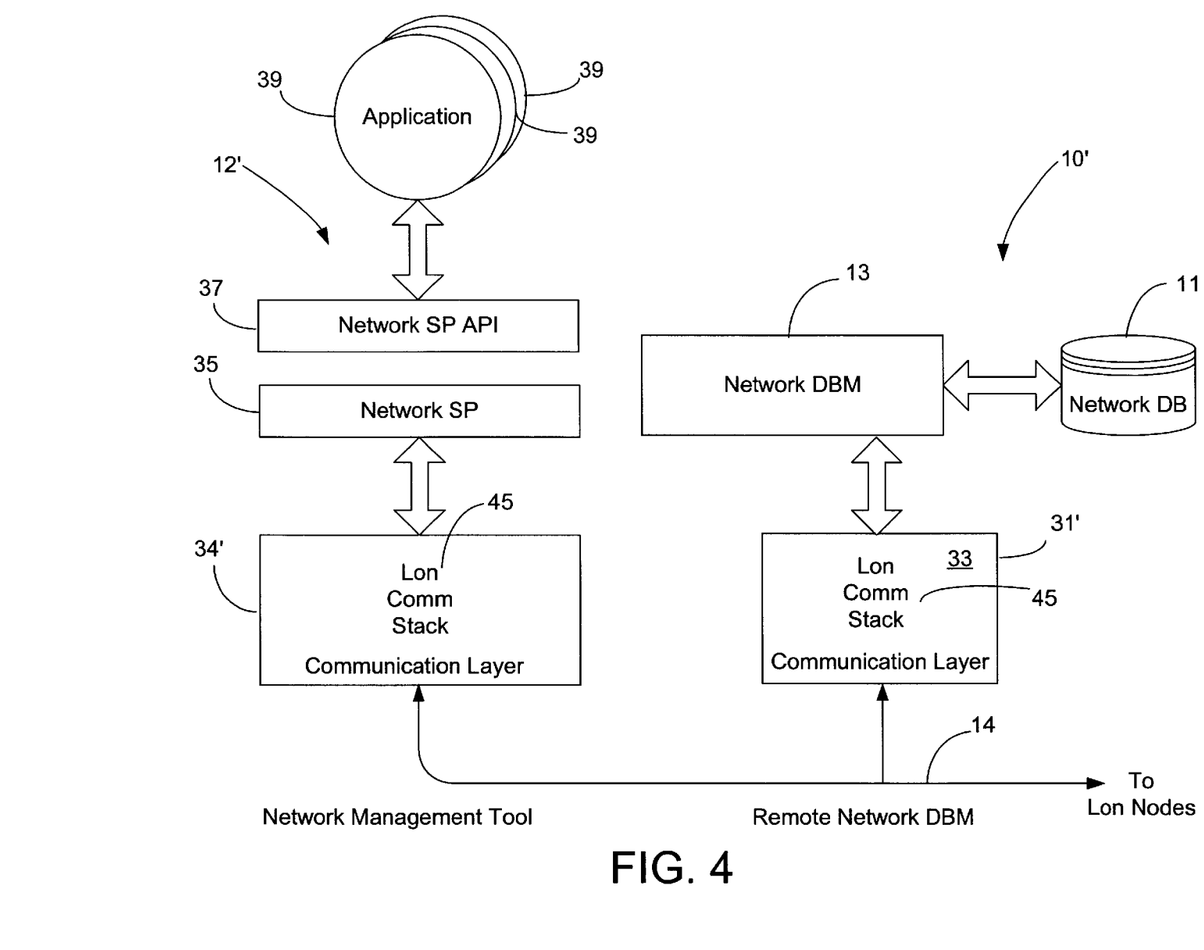

Turning to the Figures, various elements of an ECHELON network management system are depicted in accordance with the present invention. An important aspect of the present invention is the realization that in an ECHELON network management system, a particularly high volume of signal traffic may be generated between a network database and the nodes when a service is executed. The present invention thus includes an embedded node 10, 10', 16 (FIGS. 3, 4 & 5, respectively), including network database and communications elements, which is coupled locally on an ECHELON network 14 (FIGS. 3 & 4). This local coupling provides a relatively high bandwidth connection to accommodate the relatively high traffic between the network database and nodes for improved system performance relative to prior art configurations. Having the network database locally coupled to the network eliminates the need to tunnel various messages needed to effect a network service when using a tiered architecture which is common in the HVAC industry.

More particularly, as shown in FIG. 3, embedded node 10 includes a network database (network dB) 11 coupled to a network database manager (network DBMS) 13. A communications layer 31 includes com ports 32 and 33 adapted to couple node 10 to a workstation 12 via conventional network 15, and to an ECHELON network 14, respectively. As shown, communications layer 31 serves to connect network DB 11 to these networks via network DBMS 13. Network DBMS 13 is responsive to network management messages on ECHELON network 14 or workstation 12 such that network connectivity, variable and other information is maintained in accordance with the LONTALK specification.

In an alternate embodiment shown in FIG. 4, node 10' includes a communications layer 31' which may include a single com port 33, including a LONCOM (trademark of SIEBE Corporation) communication stack 45, coupled to ECHELON network 14, which in turn, is coupled to workstation 12'.

Workstations 12 and 12' include further elements depicted in FIGS. 3 & 4. Particularly, one or more application programs 39 communicate with a network service provider (network SP) 35 via a network service provider application programming interface 37 (network SP API). Network SP 35 is coupled to a communication layer. As shown in FIG. 3, a communication layer 34 may include various communication stacks, such as a BACNET (trademark of 'ASHRAE' (the American Society of Heating, Refrigeration and Air Conditioning Engineers)) communication stack 43, a serial communication stack 41, and any other suitable communication stack 44 such that a variety of communication protocols are supported by workstation 12. In the embodiment shown in FIG. 4, a communication layer 34' includes a LONCOM communication stack 45 for connecting workstation 12' to ECHELON network 14.

Figure 5:
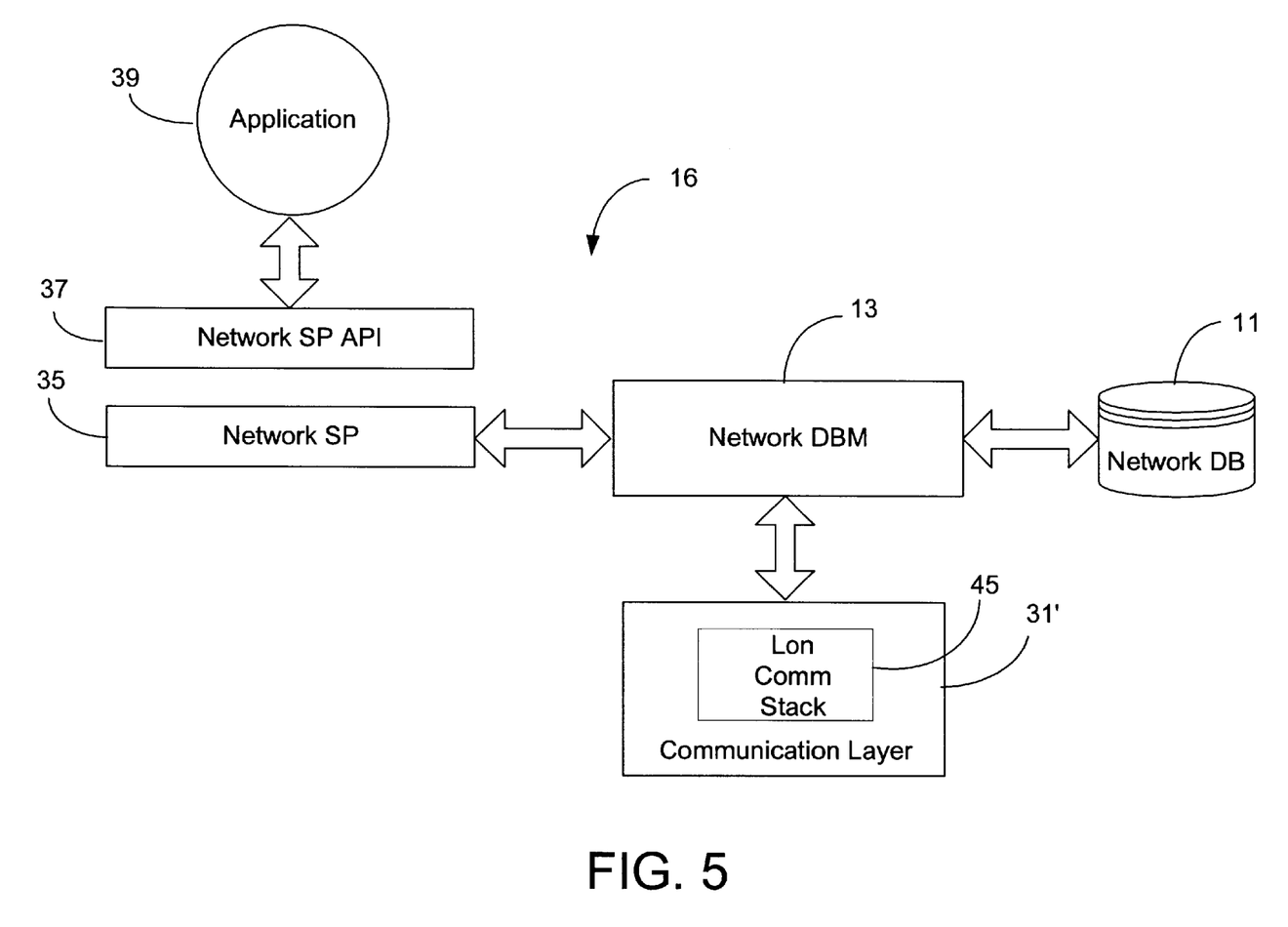

Although preferably embedded as discussed herein, in one embodiment of the present invention, network DBMS 13, network DB and network SP may be resident in a single computer, for example, a workstation 16 as depicted in FIG. 5. Network DB 11 is coupled through network DBMS 13 to communication layer 31'. Further, as discussed above, communication layer 31' includes LONCOM communication stack 45 for connection to an ECHELON network (not shown).

Figure 6:
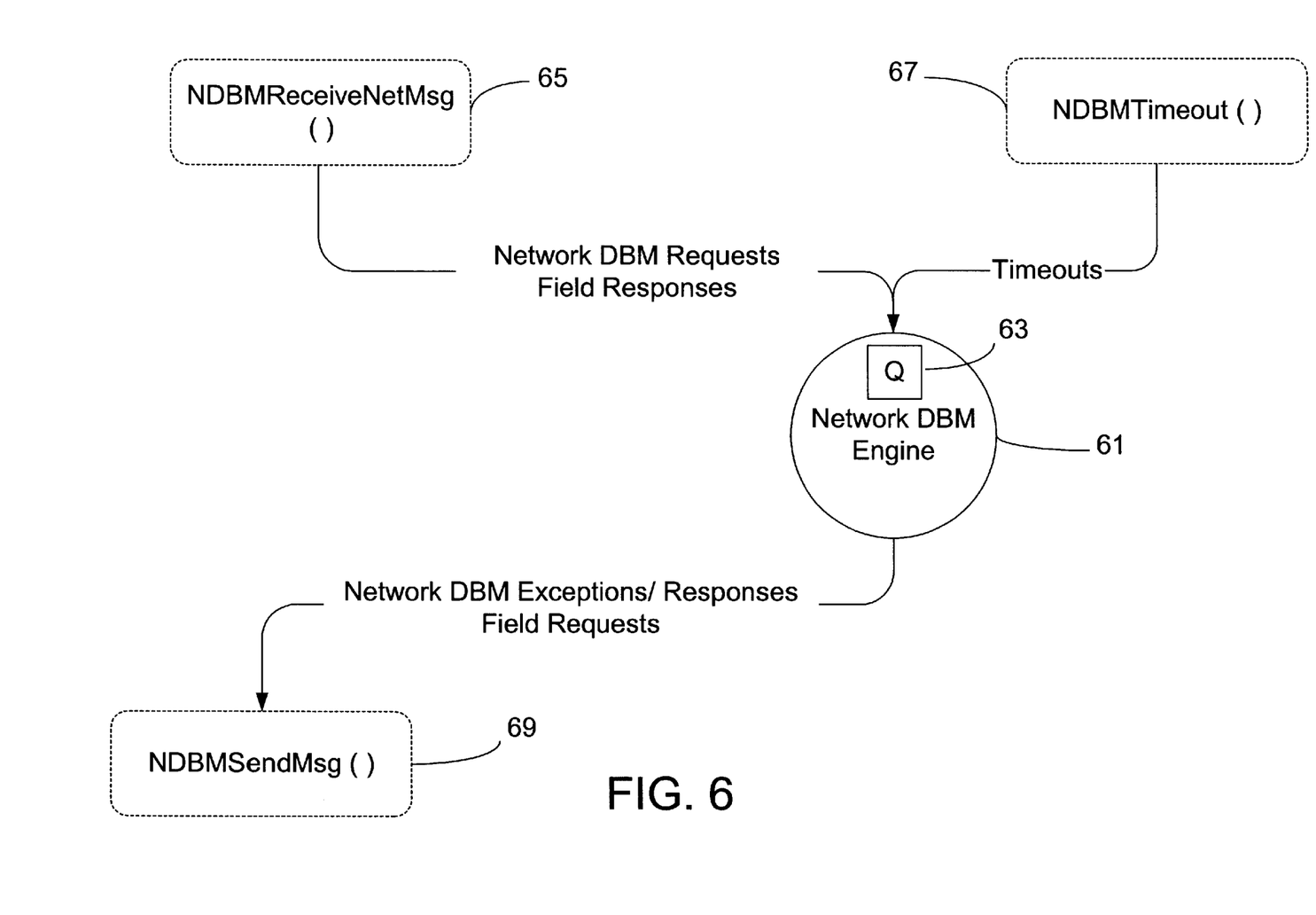
FIG. 6 is a data-flow diagram of message flow through the network database manager pursuant to an embodiment of the present invention.
Figure 7:
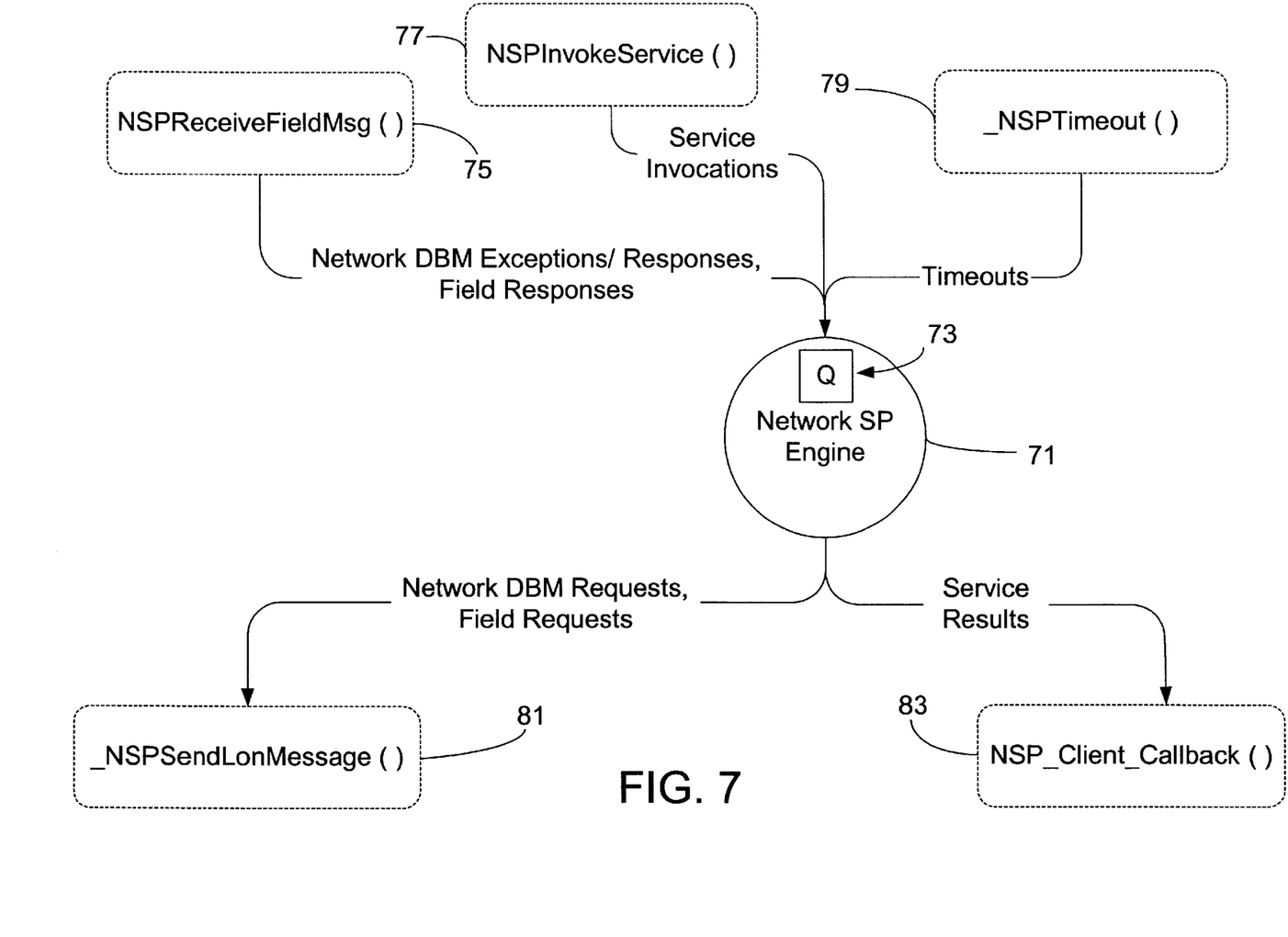
FIG. 7 is a data-flow diagram of message flow through the network service provider according to an embodiment of the present invention.

Operationally, FIGS. 6–7 are message flow diagrams corresponding to the network DBMS and the network SP.

Turning first to FIG. 6, a network DBMS engine 61 includes a queue 63 for handling message flow. Messages arrive through two mechanisms, the first being a network database manager receive network message function/procedure 65 (NDBMReceiveNetMsg( )) which is responsible for receiving network DBMS requests and field responses from the communication layer. Timeouts for non-received messages/responses are communicated to network DBMS engine 61 through network database manager timeout procedure 67 (NDBMtimeout( )). Timeouts are generated by the operating system of the host processor. Network DBMS engine 61 sends messages to ECHELON devices using the network DBMS send message function 69 (NDBMSendMsg( )) which communicates through the communication layer.

Network SP message flow is depicted in FIG. 7. A network SP engine 71 receives messages through a queue 73 from several sources. Firstly, incoming responses from local and remote client applications and the network DBMS arrive through the network SP receive field message function/procedure 75 (NSPReceiveFieldMsg( )). Service invocations arrive through network service invocation function/procedure 77 (NSPInvokeService( )). Service invocations are network management service requests from client applications. Further, timeouts for unacknowledged message sent by the network SP arrive (from the Operating System) via network service provider timeout function/procedure 79. (NSPTimeout( )).

Outbound messages from network SP engine 71 may take several paths. A send field message function/procedure 81 (NSPSendLonMessage( )) handles the sending of network DBMS requests to the network (the network DBMS may be local or remote). Service results are returned to clients using a client call back function/procedure 83 (NSPClientCallback( )).

The software structures and function calls used in operation of the network DBMS and network SP are described in detail in the attached Appendix and are summarized hereinbelow.

The NETWORK SERVICE PROVIDER API is referenced in sections 6.n of the Appendix. Briefly, the Network SP API is the set of functions which allow applications to access the services of the Network SP and, indirectly, the Network DBMS. Beginning in section 6.2.1, the NSPInit( ) function initializes the Network SP.

This allows multiple instances of the Network SP to be created to handle multiple logical networks.

The NSPClose( ) function is described in section 6.2.2. This function writes a terminate message to Network SP. The Network SP will then cleanup and terminate.

Prior to requesting any network management services, an application must register itself as a client with a call to NSPRegisterClient( ) as described in section 6.2.3 and receive a client handle. This handle will be called by the Network SP 35 to return responses to service invocations or pass exception messages received from the Network DBMS 13. A pointer to a function of type NSP_CLIENT_CALLBACK will also be passed to Network SP. This function will be called by the Network SP to return responses to service invocations or forward service pin messages from the Network DBMS. Successful registration also adds the client to the list of registered network SP clients. Conversely, the NSPDeregisterClient( ) function described in section 6.2.4 removes the client from the list of registered network SP clients.

A client invokes a service via the network SP by making a call to the NSPInvokeService( ) function described in section 6.2.5. In response to the invocation, the network SP will direct the request to either the network DBMS, or the network SP will handle it directly. Responses are returned from the network SP to the invoking client.

Each client application which will invoke network management services will supply a callback function which will process responses to service invocations. The call back function will be passed to the Network SP in a call to NSPRegisterClient( ) along with the callback handle. These client callback functions are discussed in section 6.2.6.

The Network SP is referenced in sections 7.n of the Appendix. Briefly described, the Network SP thread is started when the application calls NSPInit( ). After initialization, the NSP thread waits for messages to arrive on its queue. Messages can arrive as requests from the application (placed on the queue by NSPInvokeService( )), time out indications from the transaction timers, and responses or events from the Network DBMS.

As discussed in section 7.3, Network SP initialization starts with the creation of a message queue for receipt and transmission of messages. A communications link layer is next initialized, and handles transfer of information from the network SP to a remote network DBMS 13. Next, the network DBMS is located, as it may be either local or remote. If a network DBMS can not be found, initialization fails. Generally, the network DBMS is initialized before initialization of the Network SP.

Network SP operation is described in section 7.4. In summary of its operation, the network SP remains idle until a message arrives. Then, depending on the type of message, several execution paths are pursued. If the message is a service request from an application, then the request is forwarded to the network. A timer is started awaiting completion of the request via a confirmation response. The timer is configurable and specific wait times depend on the particular configuration.

If the message was a response (for example, from a service request), then the response timer is stopped and the response is returned to the application. If a time-out occurs (for example, the response timer expires) then a time-out response is returned to the application through client call back function/procedure 83.

Various optional Network SP Services which may be used to provide additional functionality to the network SP are set forth in sections 7.5.n. These services include NS_EXTRACT_XIF (section 7.5.1), which may be used to extract the external interface of a node from its self-identification/self documentation data. NS_DOWNLOAD_APPLICATION (Section 7.5.2) may be used to download a new application into a node. NS_READ_CP, (7.5.3) may be used to read a LonMark (trademark of Echelon Corporation) configuration property value from a node. Conversely, NS_WRITE_CP (7.5.4) may be used to write a LonMark configuration property value to a node.

Network DBMS operations and function calls are described in sections 8.n of the Appendix. Briefly described, the Network DBMS is started with a call to NetDBMInitialize( ). It consists of a single thread and two queues: a message queue and a wait queue. The wait queue is used to store pending service invocations. The message queue will receive service invocations from Network SP, respond to network management commands the Network DBMS (NDBM) has made, transaction time outs and service pin indications. The NDBM performs only one service at a time. If it is in the process of handling a service and another service invocation arrives, the second and all subsequent invocations will be placed on the wait queue. After the first service is complete, the NDBM will remove the second invocation from the wait queue and begin processing it.

Beginning at section 8.3, network DBMS initialization is described. During initialization, the message queue and a wait queue is created, the communication link layer is opened, and a conflict check is performed to insure the existence of only one network DBMS.

Network DBMS operation is described in section 8.4. To summarize the operation, a main loop begins with the network DBMS waiting for messages to arrive on the message queue. Depending on a type of message received, different actions are taken. If the message is a service invocation, and if a service is currently being executed, the invocation is put on the wait queue. If a current service is not being executed the appropriate network database or network action is taken. In the event of a network management response, if the subject command is complete, the response is sent to the application, otherwise, the next network management Command is sent. Further, one type of message may be a time-out for an unanswered response, or a service pin per the LONTALK standard or protocol.

The WHILE state==IDLE will execute once since the state is modified in the subsequent statement. There will be some services which require many transactions (i.e. create Echelon Network Management messages to be sent to a node which requires waiting for a response). There are also some services which require no transactions and will therefore return the state to IDLE immediately. In the latter instance, the WHILE loop, which is within the DO loop, will process another message from the wait queue if one is there.

Appendix sections 8.5 and 8.6 contain network database manager service message formats and network DBMS request/response formats, respectively.

Described in sections 8.6.n are the network database manager function calls used to perform network database services. To begin, the NS_ADD_NODE service request adds a node to the node table as described in section 8.6.1. The algorithm for adding a node to the network database begins with checking whether the node already exists in the network database (i.e., to eliminate redundancy). Thereafter, the existence of the device on the network is verified and pertinent ECHELON related information is determined. The node is then set off-line, configured, and thereafter set on-line.

Removing a node is performed using the NS_REMOVE_NODE service request described in section 8.6.2. According to this function, the node is removed from the node table and placed in an unconfigured state. In summary, a node is removed by first verifying that it is currently a member of the network database and that it is not a part of any connection. Then it is removed from any address groups that it is within, set in an off-line and unconfigured state, and removed from the network database.

A node may be replaced with a new device using the NS_REPLACE_NODE service request of section 8.6.3. This service request may be utilized in the event a device fails and must be replaced. This allows the new device to be configured as the same node with the same network connections as the failed device. Algorithmically, replacing a node is similar to adding a node, however; in addition to setting the new node as on-line and configured, network variables are bound to the new device.

The NS_ADD_CONNECTION and NS_REMOVE_CONNECTION network management service requests of section 8.6.4 and 8.6.5 are used to add and remove network variable connections within the LONTALK configuration. To add a connection, the nodes between which the connection exists are verified to exist in the network database and to be active. Thereafter, variable format matching issues are resolved and address and network variable tables are updated to reflect the added connection. Correspondingly, removing a connection includes verifying that the connection exists, unbinding each target, and removing the target's network variables from the network database. If all targets within the connection are deleted, then the entire connection is removed from the network database.

Explicit creation of address groups is facilitated by the NS_ADD_ADDRESS_GROUP service request of section 8.6.6 and the NS_REMOVE_ADDRESS_GROUP service request of section 8.6.7. The NS_ADD_ADDRESS_GROUP service request may be utilized to add or modify an address group. This may be necessary in the event there is an application in any node which needs to send an explicit message using group addressing. The NS_REMOVE_ADDRESS_GROUP may be utilized to remove an address group from the Network DB AddressGroup Table.

To add an address group, it is initially determined whether the group presently exists. If the group does not exist, the group is created in the network database. Then, the address table in each affected node is updated. In regard to deletion of an address group, it will first be determined that no connections are currently using that group address. If not, then the group is removed from the database and the address table in each affected node is updated.

On occasion, the network DB will need reconstruction. The NS_RECOVER_DATABASE service request described in section 8.6.8 reconstructs the network database through an interrogation of the network topology. In short, this function "learns" the network topology and configuration. This service request will be invoked when the network database is missing, suspect or a new network has been installed. Operationally, the service request broadcasts a network message requesting responses from each node and constructs the node table accordingly. Once the node table has been constructed, each node is queried to determine all address tables and binding information.

A next group of function calls is used to handle connection descriptions within the network database. Firstly, connection descriptions are added using the NS_ADD_CONN_DESC service request of section 8.6.9. This function call first checks if the maximum number of connections has been exceeded, and if not, adds the connection description to the network database. The NS_MODIFY_CONN_DESC service request (section 8.6.10) is used to modify a connection description in the network DB. The network database is checked to verify that the connection description exists. The network database is then modified and all affected nodes are modified. Lastly, connection descriptions are removed from the network database using the NS_REMOVE_CONN_DESC service request of section 8.6.11. Functionally, removal includes verifying the connection descriptions existence, checking if it is currently used, and if unused, it is removed from the network database.

A next set of commands are used to "get" and "set" properties of objects within the network DB. The NS_GET_PROPERTY service routine of section 8.6.12 is used to retrieve a property of an object within the network DB. The function call is passed a property description and object identifier, and returns the corresponding property value. Conversely, the NS_SET_PROPERTY function call of section 8.6.13 is passed an object, a property and a value to which it sets the object property.

On occasion, it may be useful to either import or export the network database. This feature is useful for backup purposes, or for moving the network database to another node. The NS_EXPORT_DATABASE and NS_IMPORT_DATABASE service request of section 8.6.14 and 8.6.15, respectively, may be used to perform network database export and import.

To facilitate communications between the network SP and the network DBMS, the network SP registers with the network DBMS. The NS_REGISTER_NSP service request of section 8.6.16 facilitates the network SP registering with, and thereby receiving event notifications (i.e. exceptions) from the network DBMS.

Network DBMS exception messages are summarized in section 8.7 of the Appendix. These messages are event driven and generated by Network DBMS. From the point of view of a Network SP, all other communications are request/response with the SP requesting and NetDBM generating a response/error. Two exceptions to these communications are defined. The NS_XCP_NETWORK_SP_ADDED exception discussed in 8.7.1 allows all other currently registered NetworkSPs know that there is another user on the network. The NS_XCP_SERVICE_PIN exception discussed in 8.7.2 is generated when a service pin is pressed on any node on the wire and the service pin message is received by NetDBM.

Figure 8:
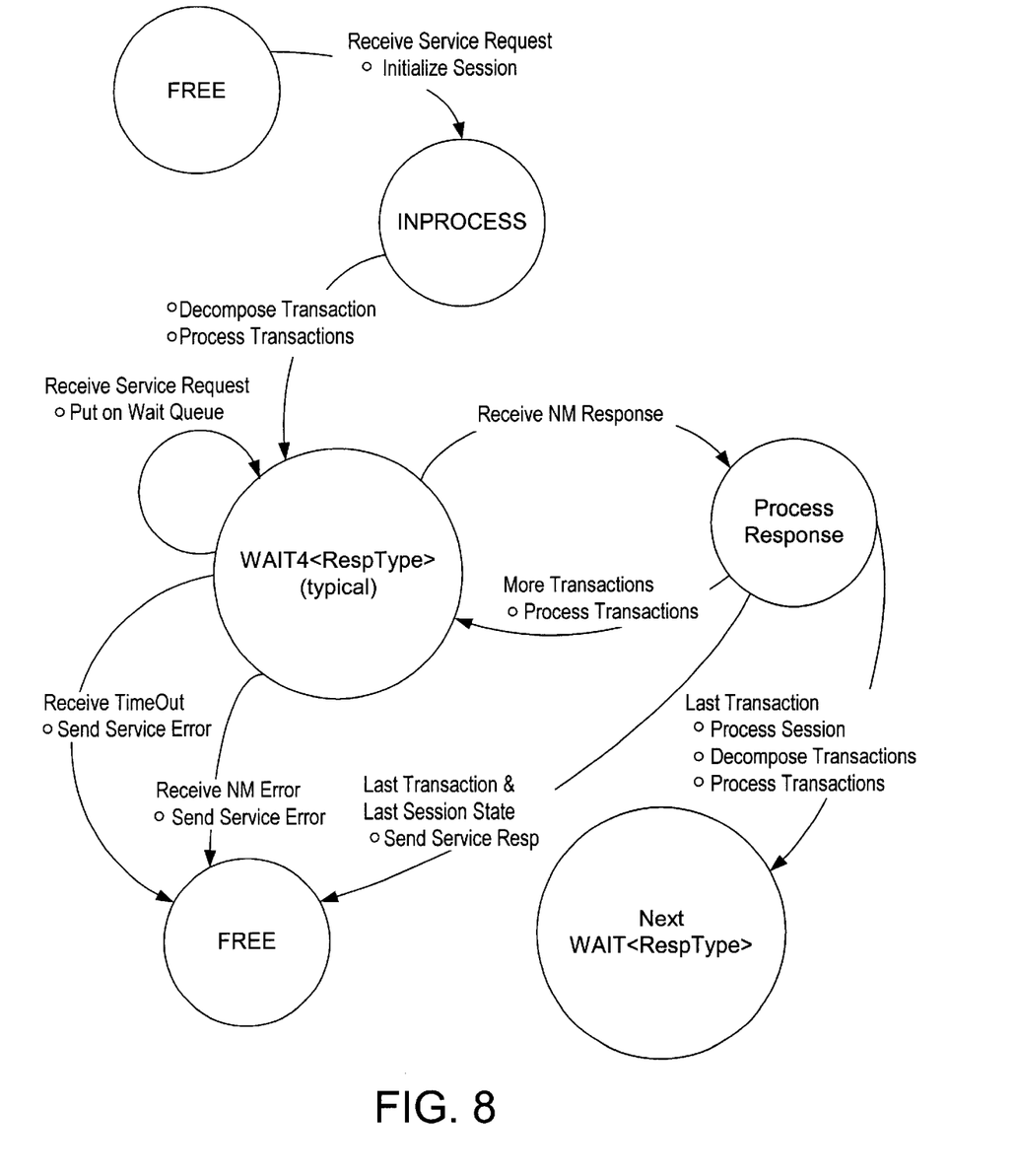
FIG. 8 is a session state diagram according to an embodiment of the present invention.

Internal Software Components are discussed in section 8.8, including the Session/Transaction State Machine described in section 8.8.1. The NetworkDBM must break each service request down to the appropriate modifications to the NetworkDB and make the appropriate changes in the affected nodes. Some services will require retrieving information from various nodes before further processing can be done. Depending on the complexity of the services a session state machine, such as shown in FIG. 8, will be employed with a number of transactions possibly required for each state. In most cases a single transaction will result in a single Echelon Network Management message being sent to a device.

Occasionally errors may be generated in the event a modification to a device required to process some Network-Management services could not be completed. Recovery of such errors is discussed in 8.8.2.

Address Table Modifications are set forth in 8.8.3. This function is used to determine the address group for a particular connection. The address groups will be scanned for a fit and if not found, an existing group will be modified or a new group will be created.

Contained in section 9 is the network database structure. Within the network database are four tables, a Node Table, Connection Tables (including HubData and TargetData), and a Group Table. The Node Table is described in section 9.2.1 and contains information on the complete network database and information for each managed node which is needed by Network DBMS to process requested services.

Figure 9:
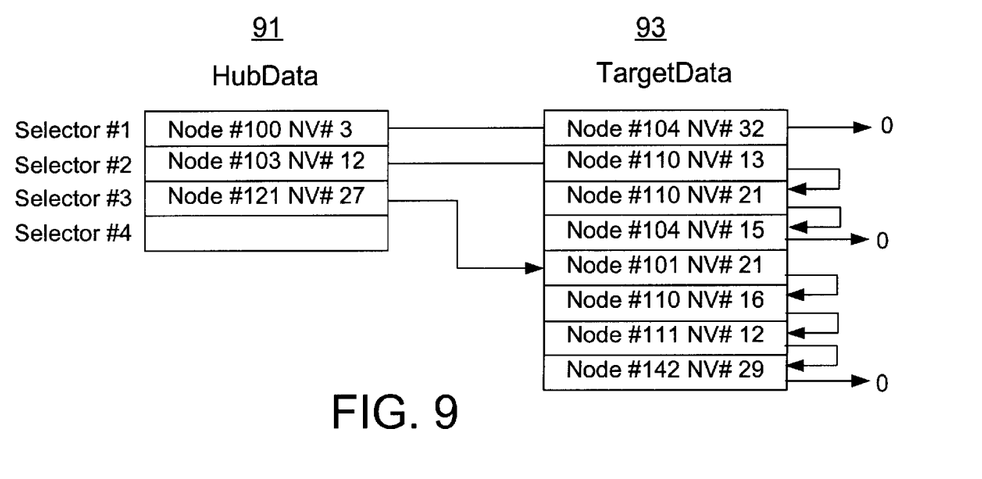
FIG. 9 is a representation of connection tables according to an embodiment of the present invention.

Information on network binding is contained in two Connection Tables discussed in 9.2.2 and shown in FIG. 9. Network bindings can be one to one, one to many, or many to one. To represent this a hub is selected which is the end of the connection with only one Network Variable (NV). Information on the hub NV is maintained in the ConnectionHub Table or HubData Table 91 and indexed by selector number. Information on one or many target NV(s) is maintained in the ConnectionTarget Table or TargetData Table 93. The links between these tables are shown in FIG. 9.

Figure 10:
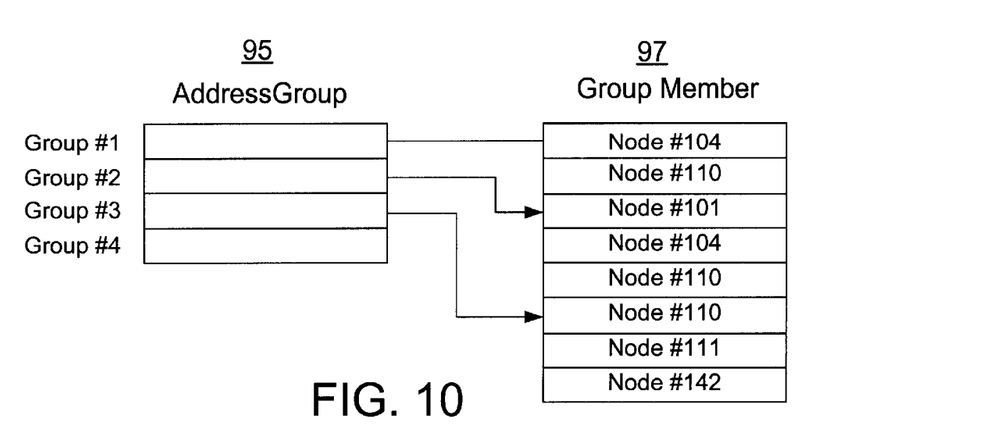
FIG. 10 is a representation of address tables according to an embodiment of the present invention.

The Group Table is discussed in 9.2.3 and shown in FIG. 10. The nodes within a given Domain can be organized in up to 255 groups. A node may belong to up to 15 groups. A group may span multiple subnets. A group may consist of a subset of MAX_NUM_NODES nodes. For acknowledged LONTALK message services a group is limited to 64 nodes. The Address Group information will be stored in two arrays. The asAddrGroup[ ] array 95 will be indexed by address group number and contain the index of the first member of the group in the asGroupMember[ ] array 97. The Group Table will also contain an array of connection descriptions.

We claim:

1. A network including at least an ECHELON network component comprising:
   a first node, on the ECHELON network component, executing a network database manager maintaining a network database of connectivity information and responsive to network management service requests from client applications via a network service provider;
   a second node on the ECHELON network component;
   a first ECHELON network connection between the second node and the first node on the ECHELON network component and wherein the network database includes connectivity information corresponding to the ECHELON network connection.

2. The network of claim 1 wherein the first node is an embedded node.

3. The network as set forth in claim 1, wherein a node on the ECHELON network component comprises a workstation node.

4. The network as set forth in claim 3, wherein the workstation node executes the client applications.

5. The network as set forth in claim 1, comprising a plurality of ECHELON network connections between a plurality of nodes residing on the ECHELON network component, and wherein the network database stores connectivity information for each of the plurality of ECHELON network connections.

6. The network as set forth in claim 5, wherein the plurality of nodes correspond to a plurality of workstations, and wherein each workstation includes at least one client application.

7. The network as set forth in claim 1, wherein the ECHELON network component is adapted for operation without the network service provider being coupled thereto.

8. The network as set forth in claims 1, wherein the client applications are integrally coupled to the network service provider, and the network service provider communicates with the first node via a network link distinct from the ECHELON network component.

9. The network as set fourth in claim 8 wherein the network database manager operates over a first network communication layer associated with the ECHELON network component and a second network communication layer associated with the network link distinct from the ECHELON network component.

10. The network as set forth in claim 8 further comprising a plurality of discrete network service providers communicatively coupled to the first node via network links distinct from the ECHELON network component.

11. The network as set fourth in claim 1 wherein the client applications are integrally coupled to the network service provider, and the network service provider communicates with the first node via the ECHELON network component.

12. The network as set forth in claim 5, wherein said plurality of ECHELON network connections include connections between the first node and a third node and the first node and a fourth node, and wherein the third node includes the network service provider; and
   the first node is locally coupled to the fourth node so that network traffic between the network database manager and the fourth node is effected irrespective of the network service provider.

13. The network as set forth in claim 1, further comprising at least a network service provider node connected to the ECHELON network component, and wherein the network service provider node supports a plurality of client applications.

14. The network as set forth in claim 13, wherein the first node is adapted for being communicatively coupled to the network service provider node.

15. A network information management node for incorporation in an ECHELON network comprising:
   a network database manager;
   a network database coupled to said network database manager;
   wherein the network database manager responds to network management service requests from multiple client applications; and
   wherein the network database includes connection tables for storing connectivity information corresponding to connections to nodes on the ECHELON network.

16. The network information management node of claim 15 wherein the network database manager is executed upon an embedded computer.

17. The network information management node of claim 15 wherein the network information management node further includes:
   a first network interface facilitating communications between the network database manager and nodes residing on the ECHELON network; and
   a second network interface facilitating communications between the network database manager and client applications executing upon at least one node residing on a second network distinct from the ECHELON network.

18. The network information management node of claim 15 wherein the first network interface executes a first communications protocol and the second network interface executes a second communications protocol that differs from the first communications protocol.

19. A method of operating a network including an ECHELON network component said method comprising:
   executing at least one application program in a first computer; executing a network service provider on the first computer, the network service provider being communicably coupled with the at least one application program to facilitate access to a network database management service for the at least one application program; and executing a network database manager on a second computer coupled to the ECHELON network, the network database manager being communicably coupled to the network service provider to facilitate providing the network database management service to the network service provider.

20. The method of claim 19 wherein the executing steps comprise:
   creating a message queue;
   creating a wait queue on the second computer for requests, from the second computer, for the network database manager service;
   receiving, by the network database manager, network database management service requests;
   receiving, by the second computer, LONTALK messages over said ECHELON network;
   processing, by the network database manager, LONTALK messages relating to a current network management service request through said message queue; and
   storing, by the second computer, messages relating to other than current network database management service requests on said wait queue.

* * * * *